E. F. ANDREWS.
STORAGE BATTERY CHARGING SYSTEM.
APPLICATION FILED JAN. 8, 1917.
1,356,753.   Patented Oct. 26, 1920.
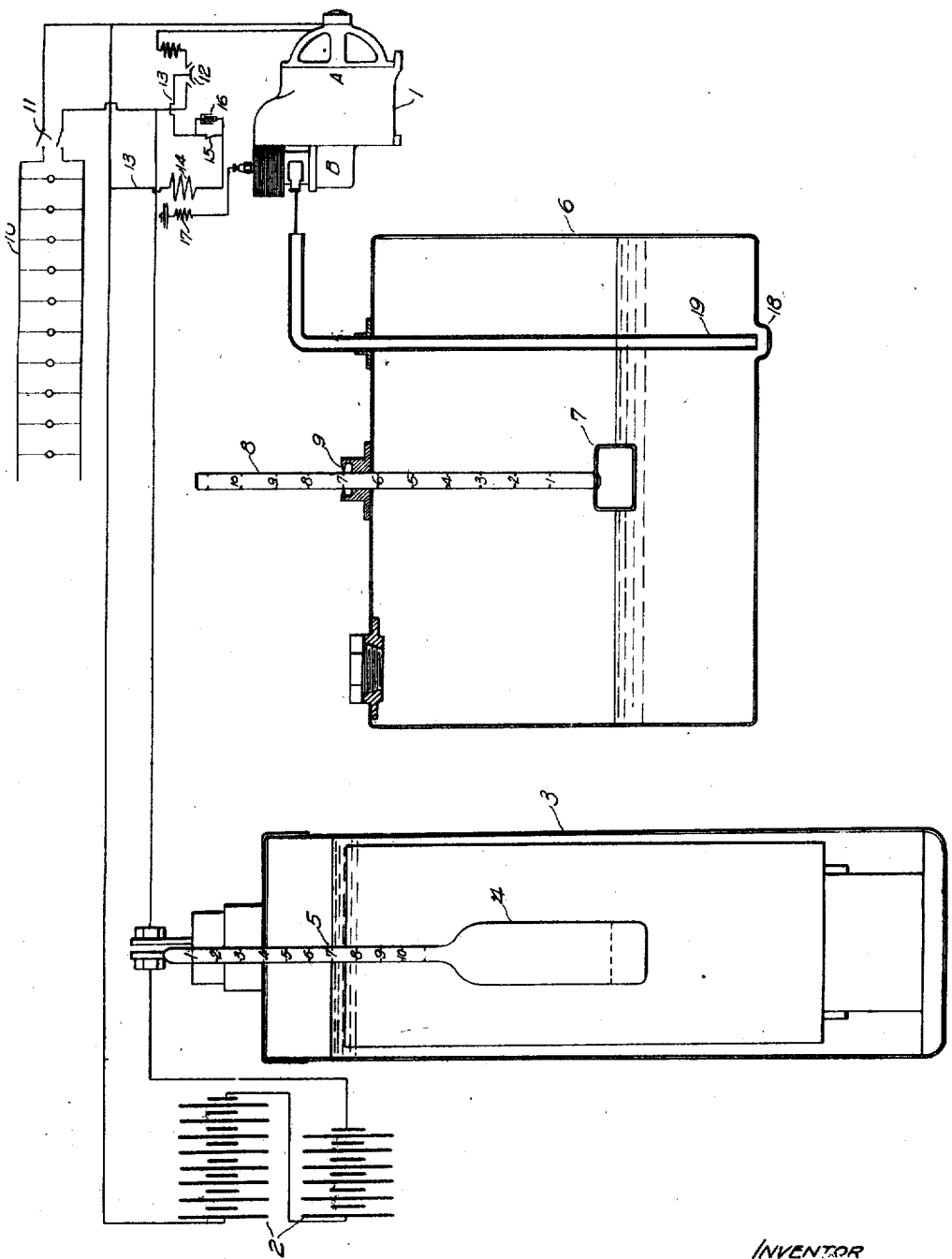
INVENTOR
EDWARD ANDREWS.

UNITED STATES PATENT OFFICE.

EDWARD F. ANDREWS, OF CHICAGO, ILLINOIS.

STORAGE-BATTERY-CHARGING SYSTEM.

1,356,753.  Specification of Letters Patent.  Patented Oct. 26, 1920.

Application filed January 8, 1917. Serial No. 141,153.

*To all whom it may concern:*

Be it known that I, EDWARD F. ANDREWS, a citizen of the United States, residing at Chicago, in the county of Cook and State of Illinois, have invented a certain new and useful Improvement in Storage-Battery-Charging Systems, of which the following is a full, clear, concise, and exact description.

My invention relates to improvements in storage battery charging systems.

It relates more particularly to means and a method for bringing the storage battery to a condition of full charge without objectionable overcharge, and is especially applicable to isolated generating plants of the type used in rural districts, although not limited thereto.

Heretofore, much difficulty has been encountered by the users of generating plants of this type, owing either to the complicated and delicate apparatus employed to control the charging of the storage batteries, or to the fact that considerable technical knowledge was necessary on the part of the user in order to obtain satisfactory results. Oftentimes, the life of a battery is materially shortened and the efficiency of the whole plant greatly reduced either by undercharging or overcharging, due to the operator's lack of knowledge of such complicated apparatus, or to the failure of such apparatus to properly perform its function.

The general object of the present invention is to provide means and a method whereby the difficulties heretofore experienced in the charging of storage batteries are largely overcome.

A further object of the present invention is to provide a cheap, simple, and easily operated means whereby the storage battery of an isolated electric lighting plant can be brought up to the proper condition of charge, without undue overcharge.

A further object is to provide a system of the type described whereby the battery of such a plant may be properly charged with a minimum of attention from the operator.

These objects are attained by providing a generator, an internal combustion engine adapted to drive the same, a fuel reservoir for said engine, a storage battery connected to said generator, a hydrometer for one of the cells of the battery, and a gage or other measuring device, for indicating the amount of fuel in the reservoir, the hydrometer and the fuel gage being so calibrated as to indicate readily to the operator how much fuel should be put into the reservoir to enable the engine to drive the generator for a length of time just sufficiently to fully charge the battery, at the end of which time the stopping of the engine for lack of fuel prevents further charging.

Further objects and advantages of the invention will be apparent from the following detailed description of the embodiment of the invention shown in the accompanying drawings. It is to be understood that the disclosure is for the purpose of illustration only, and not as defining the limits of the invention.

In the drawings is disclosed a diagrammatic view illustrating a system embodying my invention, wherein 1 designates a single unit power plant comprising an electric generator A and a prime mover preferably in the form of an internal combustion engine B, coupled to and adapted to drive said generator A. Connected in series with the generator A of the power plant 1 is a storage battery 2, preferably, although not necessarily, provided with a pilot cell 3, which is in turn provided with a hydrometer 4 of any suitable type, adapted to float in the electrolyte of said pilot cell for the purpose of indicating to the attendant the condition of charge of the battery. To this end, the upper portion of the hydrometer is calibrated as shown at 5, so that the degree of charge or discharge of the battery may be readily ascertained. It is a well known fact that the specific gravity of the electrolyte decreases as the battery discharges, and that conversely, the specific gravity increases as the charge of the battery increases. Thus it will be seen that the hydrometer reading will give a close approximation of the condition of charge of the battery.

It is obvious that instead of the hydrometer and pilot cell combination, illustrated in the drawings, a syringe hydrometer may be used, into which electrolyte may be drawn from any one of the battery cells, in order to ascertain the condition of charge of the battery.

The prime mover B of the power plant 1 is supplied with fuel from a reservoir 6 of any desired shape or size. Positioned within the reservoir is a float 7 shown provided with a suitable gage 8, the registration of the calibrations of the gage with an indicator 9 mounted on the reservoir, serving to indicate the fuel level within the reservoir. The float 7 and indicating mechanism 8 and 9 may be of any preferred construction. As shown in the drawing, however, an opening is provided in the top wall of the reservoir through which the gage 8 is free to reciprocate according to the rise or fall of the fuel and pointers 9 are shown adapted to register with the calibrations on the gage 8.

The fuel reservoir 6 is preferably of such a size that when filled with fuel and the prime mover B started, it will keep the generator running just a sufficient length of time to effect the proper and complete charging without undue overcharge of the battery, provided that the battery was fully discharged at the time the charging operation was started. The proper size of the reservoir, in the first instance, may be readily ascertained by suitable tests. It is also preferable that the reservoir 6 be provided with a sump 18, into which the fuel feed pipe 19 dips, in order to provide a more definite level at which the fuel supply to the engine ceases. This, however, is not essential.

A further feature of the invention is the arrangement of the calibrations on the fuel gage 8 to facilitate their being read in conjunction with the reading of the hydrometer, so that the hydrometer reading indicates to the attendant not only the condition of the charge or discharge of the battery, but also the amount of fuel necessary to be placed in the reservoir 6 to fully charge the battery, from any state of discharge as indicated by the hydrometer. One means for accomplishing this result is shown in the drawings, but it is obvious that the result may be attained in various other ways, and hence I do not wish to be limited to the particular structural features shown. As shown in the drawings, the hydrometer calibrations run from 1 to 10, starting at the top, and indicate the condition of charge or discharge of the battery, while the calibrations on the fuel gage 8 run from 1 to 10, starting at the bottom, and indicate the amount of fuel in the reservoir. As previously pointed out, the specific gravity of the electrolyte increases as the charge increases; hence as current is supplied by the generator to the battery and the charging progresses, the specific gravity of the electrolyte is increased and the hydrometer 4 is caused to rise. At the same time, fuel is being drawn from the reservoir 6 by the prime mover B and the fuel gage therefor gradually falls. Assuming then that the proper tests have been made, it is obvious that the calibrations on the hydrometer and those on the fuel gage may be so arranged and related as to indicate to the attendant, not only the condition of the battery but also the point to which the reservoir must be filled in order to fully charge the battery, from whatever state of discharge it may happen to be in. The fuel tank if desired may be so proportioned and the hydrometer and fuel gage so graduated that instead of bringing the battery just to full charge with the amount of fuel put into the tank, a quantity of fuel may be put in which will give any desired amount of overcharge to the battery at each filling of the tank.

It is well known that hydrometer readings vary with temperature. The hydrometer used with this system may have its readings corrected for temperature in various ways well known in the art. A compensating hydrometer may also be used which gives the correct reading at any temperature without correction.

The work circuit is shown at 10, in the form of a lamp circuit, a switch 11 being provided to control the same. The generator is preferably shunt-wound, but not necessarily so. An underload circuit breaker is shown at 12, its function being to prevent any discharge of battery current through the generator when the generator voltage is less than that of the battery, except when starting, at which time the generator is operated as a motor in order to start the engine B. Although the ignition system of the engine forms no part of the present invention, a circuit suitable for the purpose is illustrated in the drawings consisting of a primary circuit 13, including a primary coil 14, together with an interrupter 15 and a condenser 16 in parallel with said interrupter, this primary circuit being connected across the battery terminals through the underload circuit breaker 12. A secondary circuit is also shown, including a secondary coil 17 suitably connected to the spark plug and to the ground. Whenever the underload circuit breaker opens the circuit from the generator to the battery, the primary circuit 13 of the ignition system is also opened, thereby causing the engine to stop.

The charging system herein described is most suitably used in cases where it includes an electric generating plant consisting of a generator driven by an internal combustion engine, the load imposed on the engine by the generator constituting the only continuously operating governing means. As the power output of an engine under these conditions is approximately constant, the power or watt output of the generator is also approximately constant, and if a storage battery is connected across the terminals of the generator, the amount of current flowing into the battery will be determined by the counter E. M. F. of the battery. When the battery is low in charge and its voltage is low, the charging current will be high, and toward the end of the charge as the battery voltage increases, the charging current will decrease, the watts or electrical energy consumed remaining the same. Under these conditions it will appear that when the total electrical energy produced by the generating unit is being used to charge the battery, the factors to be considered in bringing the battery up to full charge without undue overcharge are first, the condition of charge of the battery at the time charging is commenced and, second, the length of time that the prime mover and generator must be run in order to bring the battery up to the desired condition.

It is obvious, however, that instead of the particular system of governing described herein, any suitable governing means may be employed. For instance, it may be desirable to so arrange the prime mover that it can be made to give less than its normal power output. This may be desirable in order to reduce the charging rate of the storage battery toward the end of its charge. The decrease in power of the prime mover, which effects a corresponding decrease in the electrical output of the generator, may be brought about by hand adjustment or automatically in any well known manner. This change of output has no effect on the principle of operation of this system, because if the power is decreased, thus requiring a longer run of the generator to charge the storage batteries, the fuel consumption is also decreased, thus requiring similarly longer time to exhaust the supply of fuel in the tank.

From the foregoing description, the operation of the system will be readily understood. Assuming that the hydrometer reading is at 7, this indicates to the attendant that the battery is approximately 30 per cent. discharged and also that it is necessary to fill the reservoir until the fuel gage registers 7, in order that the engine, after it is started, shall drive the generator just long enough to fully charge the battery, at the end of which time it will stop for lack of fuel, thus automatically preventing the battery from being unduly overcharged. This operation presupposes that all of the electrical energy produced by the generator is available for charging the battery. When the lamps or other translating devices are being used on the circuit 10 while the battery is being charged, the generator output will be divided between the battery circuit and the work circuit.

It will appear from this consideration, that if the hydrometer reading is taken and the proper amount of fuel put into the fuel tank, to effect the complete charging of the battery from the point of charge indicated by the hydrometer, and if, during the charging operation, current is taken from the generator circuit which is consumed otherwise than in charging the battery, the said battery will not be fully charged when the prime mover stops for lack of fuel. Under these conditions, it will be necessary to read the hydrometer a second time and to refill the fuel reservoir until the reading of the fuel gage coresponds with the reading of the hydrometer and to restart the engine B in order to effect the complete charging of the battery. However, such service as this is the exception, rather than the rule, as the users of isolated lighting plants generally prefer to charge their batteries in the daytime and derive current for their lights and other translating devices in the evening from the battery alone. If for any other reason than that mentioned above, such as overdischarge of the battery or improper working of the engine, the battery does not come up to full charge with the amount of fuel indicated by the hydrometer reading, it can be easily brought to the desired condition by taking a second hydrometer reading and refilling the tank as above described.

It is not essential that the fuel tank be large enough to run the engine for sufficient time to completely charge the storage battery from a condition of entire discharge. For instance, in charging large batteries with a small engine, it might be desirable to provide a tank holding only half the fuel necessary for complete charging. It might be necessary to do this to comply with the Underwriters' requirements, which stipulate that not more than one gallon of gasolene may be kept in certain buildings without raising the fire insurance rates. In such cases it is necessary only to take the hydrometer reading each time the fuel becomes exhausted and to fill the tank to the point indicated by the hydrometer, if possible. If this point be beyond the capacity of the tank, it is obvious that the tank must be completely filled and then refilled after the first instalment of fuel is exhausted, in order to completely charge the battery. It is obvious, however, that the principle of operation of this system is the same no matter how many times the tank must be filled to completely charge the battery.

It is obvious that this invention is not limited in its scope to electric lighting plants, but is capable of much broader application. It is also clear that the invention is susceptible of embodiment in various forms and hence I do not limit myself to the present apparatus, except where limitations are imposed in the appended claims.

Having thus described my invention, what I claim as new and desire to secure by Letters Patent of the United States is:

1. The combination with a current generating source comprising a generator and an internal combustion engine, a storage battery connected with said generator, a hydrometer associated with said battery, a fuel reservoir adapted to supply fuel to said engine, a gage for said reservoir, said hydrometer being so related to said gage as to indicate the reading which the gage should be made to give by the fuel in said reservoir in order to fully charge said battery.

2. A system of the class described, comprising a single unit power plant, a storage battery, the pilot cell of which is provided with a hydrometer, and a fuel tank for said power plant, said hydrometer being calibrated in such wise that a reading thereof, indicates the amount of fuel to be placed in said tank to fully charge said battery.

3. The combination with a single unit power plant, comprising a generator, and a prime mover, of a storage battery connected to said generator adapted to receive its charge therefrom, a fuel reservoir adapted to supply fuel to said prime mover, and indicators coöperating with said battery and said reservoir adapted to indicate the amount of fuel necessary to be placed in said reservoir to fully charge said battery without undue overcharge.

4. The combination with an electric generator and an internal combustion engine adapted to drive the same, of a storage battery connected with said generator and adapted to receive its charge therefrom, a fuel reservoir for said internal combustion engine, and a hydrometer for determining the condition of the charge of said storage battery, said hydrometer being provided with means for indicating the amount of fuel necessary to be placed in said reservoir to operate the said generator by means of said engine for a proper length of time to effect the complete charging of said battery, at the end of which time said engine will stop for lack of fuel, thus preventing undue overcharging of said battery.

5. A system of the class described, comprising a power plant, a storage battery connected thereto, a fuel reservoir adapted to supply fuel to said power plant, and means to determine the amount of fuel necessary to fully charge said battery.

6. An isolated electric generating system, comprising a generator, an internal combustion engine for driving the same, a storage battery connected to said generator, a fuel reservoir for said engine, a hydrometer for indicating the state of charge of said battery and having indications thereon, and a float in said reservoir also having indications thereon, said hydrometer and float indications being so related that it is only necessary to read said hydrometer and add fuel to said reservoir until the float indications coincide with the corresponding indications on the hydrometer, in order to fully charge the battery without unduly overcharging it.

7. The method of insuring the charging of a storage battery to a desired state of charge from any particular state of discharge in a system in which the battery is charged by a generator driven by an internal combustion engine, which method comprises predetermining the amount of fuel necessary to supply the deficiency of charge and supplying only this amount of fuel to the engine.

8. The combination with a battery charging system comprising a generator, a prime mover, and a battery connected with said generator and adapted to receive its charge therefrom, of a hydrometer for said battery, said hydrometer being calibrated in terms to indicate the amount of fuel which will be required to operate said prime mover just a sufficient length of time to fully charge said battery regardless of its degree of discharge.

9. The combination with a battery charging system comprising a generator, a prime mover, and a battery connected with said generator and adapted to receive its charge therefrom, of means associated with said battery for indicating substantially the exact amount of fuel necessary to operate said prime mover to effect a complete charging of said battery.

10. The combination with an electric generator and an internal combustion engine adapted to drive the same, of a storage battery connected with said generator and adapted to receive its charge therefrom, a fuel reservoir for said internal combustion engine, and means associated with said battery for indicating the amount of fuel required to be placed in said reservoir to fully charge said battery, the amount of fuel indicated by said means varying according to the condition of discharge of the battery and being such an amount that the same will be completely exhausted when the battery has reached a fully charged condition, thereby causing said engine to stop and preventing undue overcharging of said battery.

11. The combination with a single unit power plant, comprising a generator, and a prime mover, of a storage battery connected to said generator adapted to receive its charge therefrom, a fuel reservoir adapted to supply fuel to said prime mover, and indicators coöperating with said battery and said reservoir adapted to indicate the amount of fuel which will be required to fully charge said battery without undue overcharge.

12. A system of the class described, comprising a single unit power plant, a storage battery, the pilot cell of which is provided with a hydrometer, and a fuel tank for said power plant, said hydrometer being calibrated in such wise that a reading thereof indicates the amount of fuel to be supplied to said power plant from said tank in order to fully charge said battery.

In witness whereof I hereunto subscribe my name.

EDWARD F. ANDREWS.